United States Patent [19]
Lee

[11] Patent Number: 5,921,014
[45] Date of Patent: Jul. 13, 1999

[54] OUTRIGGER LOWERING APPARATUS

[76] Inventor: Terry R. Lee, 10347 SW. 118th St., Miami, Fla. 33176

[21] Appl. No.: 09/022,865

[22] Filed: Feb. 12, 1998

Related U.S. Application Data

[51] Int. Cl.⁶ .................................................. A01K 97/10
[52] U.S. Cl. ........................... 43/21.2; 248/515; 248/514
[58] Field of Search ............................. 43/21.2; 248/514, 248/125.8, 404, 407, 515

[56] References Cited

U.S. PATENT DOCUMENTS

| | | |
|---|---|---|
| 1,793,910 | 2/1931 | Cuthbert et al. . |
| 2,312,957 | 3/1943 | Cannon, Jr. . |
| 2,692,106 | 10/1954 | Herrmann . |
| 2,706,608 | 4/1955 | Joseph . |
| 2,927,754 | 3/1960 | Davis . |
| 3,010,687 | 11/1961 | Hagberg . |
| 3,161,390 | 12/1964 | Larson ..................................... 248/514 |
| 3,724,791 | 4/1973 | Mason . |
| 4,932,152 | 6/1990 | Barlotta et al. . |
| 5,054,737 | 10/1991 | Delancey ................................. 248/515 |
| 5,210,971 | 5/1993 | Efantis ..................................... 43/21.2 |

*Primary Examiner*—Michael J. Carone
*Assistant Examiner*—Judith A. Nelson
*Attorney, Agent, or Firm*—Malloy & Malloy, P.A.

[57] ABSTRACT

An outrigger lowering assembly structured to pivot a fishing pole between a generally lowered and a generally elevated orientation, the assembly including an outrigger engagement hub having a retention segment which receives a fishing pole butt end of the fishing pole securely therein, and a pivot segment supportingly extending from the retention segment into pivoted, supported engagement with a base assembly that is secured to the boat. The pivot segment pivots relative to the base assembly so as to vary an elevation orientation of said outrigger engagement hub between a first and a second elevation positions, and the base assembly includes a first and a second housing portions movably coupled with one another between a locked orientation and a disengaged orientation, wherein the locked orientation maintains a pin in a corresponding lock position of a channel, and the disengaged orientation moves the pin out of the lock position so as to permit pivoted movement of the outrigger engagement hub into another elevation orientation. Upon reaching the new elevation orientation, a restraining assembly urges the pin into a corresponding lock position so as to maintain the desired orientation of the outrigger engagement hub, and accordingly, the fishing pole.

13 Claims, 2 Drawing Sheets

OUTRIGGER LOWERING APPARATUS

BACKGROUND OF THE INVENTION

1. Field of the Invention

The present invention relates to an outrigger lowering assembly structured to supportably receive and retain an outrigger pole, while enabling substantially quick and easy pivoted movement thereof between an elevated and a lowered orientation, and thereby facilitating movement of a boat carrying one or more of the outrigger poles beneath an overlying obstacle such as a bridge, wires, cables, trees and the like, without requiring actual removal of the outrigger pole from its secured position to permit passage.

2. Description of the Related Art

Many commercial and sport fishing boats often utilize outrigger fishing assemblies to aid in the casting of multiple lines during trolling type fishing. In particular, and as can be expected, it is important to ensure that when multiple lines are utilized for fishing purposes, the lines be spaced apart from one another and from the boat, thereby not being susceptible to tangling with one another or with portions of the boat, such as a propeller. To this end, conventional outrigger assemblies generally include tubular supports into which a fishing pole butt end of the outrigger pole is introduced and secured. Typically, these outrigger fishing assemblies are structured so as to permit the fishing pole to swivel away from the boat into a generally perpendicular orientation from the boat, thereby maximizing the spacing of fishing line which drop into the water from the boat and/or from other fishing lines.

A further important consideration as to the orientation of the outrigger fishing assembly is the fact that these outrigger poles generally extend away from the boat in a generally elevated or upwardly angled orientation. In particular, for purposes such as maintaining a secure hold and strong posture of the rod in case a fish hits the line, or to further minimize potential tangling between multiple lines, the fishing pole butt end, which may include an arcuate type of configuration, is secured such that when deployed, the fishing pole extends upwardly away from the boat at typically a 45 degree or greater angle from horizontal. Unfortunately, however, positioning a large number of the fishing poles in such an elevated orientation also substantially increases the overall height profile of the boat being utilized and the minimum height of obstacles under which the boat can freely pass is substantially increased. As can be expected, the increase of the height profile can lead to a variety of circumstances wherein an approaching obstacle cannot be effectively cleared with the outrigger poles in place. This is especially the case for drawbridges encountered by the fishing boat which often have heights linked to the normal height of a fishing boat without extension. Specifically, although drawbridges will open for boats and the like having a normal height profile which is greater than the maximum height allowance of the particular drawbridge, in many localities, the presence of upwardly extending outrigger pole assemblies does not constitute sufficient grounds for the drawbridges to be opened, especially if the normal height profile of the boat without the outrigger fishing assembly is within clearance of the drawbridge. Accordingly, fishermen encountering such situations had been forced to develop solutions to this increased height profile problem.

Absence of viable solution in the related art, however, the common solution to the aforementioned problem associated with height clearances that are extended by outrigger pole, involves the early identifying an approaching obstacle and the subsequent immediate removal of each fishing pole from the outrigger support assembly. As such, while the boat clears the obstacle, the fishing poles are placed, often precariously, on the boat's deck in a generally horizontal orientation, which attempts to ensure that the lines do not get tangled and are somehow spaced from the boat propeller, until the obstacle is cleared and each fishing pole can be returned into the outrigger support assembly. As can be expected, however, such a procedure can be quite laborious and difficult to accomplish. For example, the outrigger support assemblies are typically structured with a mating structure so as to provide a secure engagement between the fishing pole and the support assembly, thereby preventing the fishing pole from being dislodged from the support assembly if the weight of a fish striking the bait is exerted thereon. As a result, it can be quite arduous and time-consuming to unlock and remove each fishing pole from the desired orientation each time an obstacle is encountered and before the obstacle is reached without having to stop the boat. Moreover, the risk of entanglement of the various fishing rods is greatly increased when the rods are removed from their desired orientations and are placed, often side by side in a horizontal unsupported orientation.

Accordingly, it would be highly beneficial in the art to provide an outrigger lowering assembly which can effectively retain an outrigger pole securely therein, but which provides for rapid and facilitated pivoted movement of the fishing pole between an elevated orientation and a lowered orientation. Such a device would greatly facilitate the passage of a fishing boat containing outrigger pole assemblies passed a lower obstacle, while still maintaining the effective interlocked engagement of the fishing pole and maintaining the preset spacing and deployment of the various fishing poles. Moreover, such a device should be substantially quick and easy to utilize, such as in emergency type situations, and should be substantially durable and sturdy so as to permit extended use and so as to minimize the risks of accidental lowering of the fishing pole.

SUMMARY OF THE INVENTION

The present invention relates to an outrigger lowering assembly. In particular, the outrigger lowering assembly includes an outrigger engagement hub that is structured and disposed to receive the fishing pole butt end of an outrigger type fishing pole securely therein. Preferably, the outrigger engagement hub includes a conventional mating or locking engagement configuration such that the fishing pole butt end of a conventional outrigger pole can be preferably centrally deployed therein and secured in a conventional fashion for use during fishing and normal running of the boat.

The outrigger engagement hub of the present invention includes a retention segment and a pivot segment. The retention segment is structured to actually receive the fishing pole butt is end therein, while the pivot segment extends from the retention segment. In particular, the pivot segment is structured to be pivotally coupled and/or interconnected with a base assembly so as to supportably position the retention segment. The base assembly of the present invention is preferably an elongate support that is structured to be supportably coupled to a support surface such as a surface of the boat itself. Moreover, the pivot segment is structured to pivot relative to the base assembly in such a manner as to vary in elevation orientation of the outrigger engagement hub between at least a first elevation position and a second elevation position. For example, the first elevation position preferably positions the retention segment so as to maintain the fishing pole in a generally lowered orientation. Conversely, the second elevation position positions the retention segment in such a manner as to maintain the fishing pole in a generally elevated orientation, such as the normal fishing orientation.

The base assembly of the present invention includes at least a first housing portion and a second housing portion movably coupled with one another. In particular, the first and second housing portions are structured to move between a locked orientation and a disengaged orientation. Moreover, a restraining assembly is provided and is structured to maintain the first and second housing portions of the base assembly normally in the locked orientation. Along these lines, the base assembly also includes a lock element. The lock element which preferably includes an elongate pin is structured and disposed to move with corresponding relative movement between the first and second housing portions, such as between the locked and disengaged orientations.

Conversely, the pivot segment includes a mating lock structure. The mating lock structure, which preferably includes a channel, is disposed in mating interconnection with the pin of the lock element so that the pin is able to selectively move through the channel upon pivoted movement of the pivot segment. Furthermore, the channel includes at least two lock positions defined therein. Each of the lock positions is structured to correspond one of the elevation orientations of the outrigger engagement hub and is structured and disposed to retain the pin of the lock element therein while the first and second housing portions are disposed in their locked orientation. As a result, pivoted movement of the pivot segment relative to the base and out of a select one of the first and second elevation positions is restricted when the first and second housing portions are in the locked orientation. When, however, the first and second housing portions are moved into the disengaged orientation, the pin is structured to move out of the lock position and through the channel, thereby permitting pivoted movement of the pivot segment relative to the base and between the first and second elevation positions.

It is an object of the present invention to provide an outrigger lowering assembly which quickly and effectively lowers an outrigger pole from a normally deployed or elevated orientation to a lowered orientation.

Yet another object of the present invention is to provide an outrigger lowering assembly which is quick and easy to manipulate in a variety of circumstances.

A further object of the present invention is to provide an outrigger lowering assembly which securely maintains the fishing pole in a desired orientation both during fishing and movement of the boat at higher rates of speed.

An added object of the present invention is to provide an outrigger lowering assembly which is cost effective to construct and implement, is relatively free from malfunction, and does not require complex, bulky and/or intricate structure for its manufacture and/or operation.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
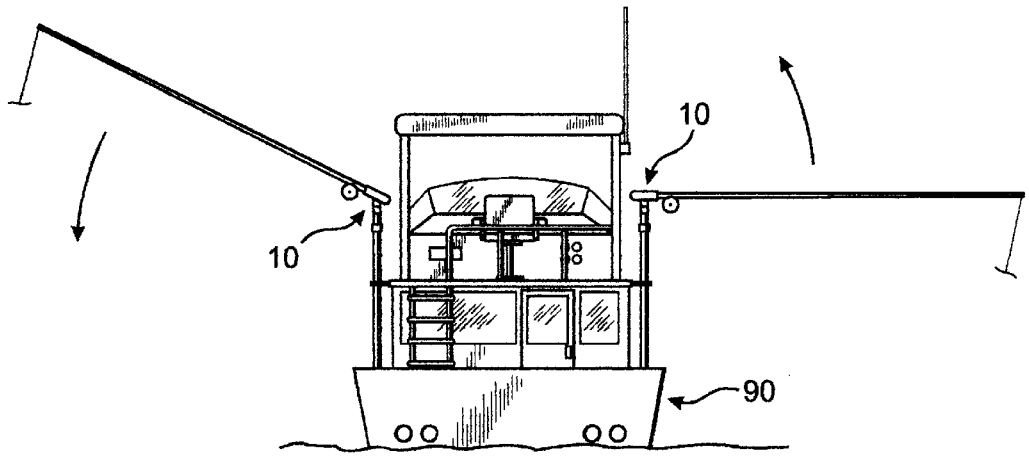
FIG. 1 is a perspective view of multiple outrigger lowering assemblies in use on a boat.

Shown throughout the Figures, the present invention is directed towards an outrigger lowering assembly, generally indicated as 10. In particular, the outrigger lowering assembly 10 is structured for use on commercial and sport fishing boats 90 in order to quickly and conveniently provide for multiple elevations of an outrigger pole 24 which is retained securely thereby in an outrigger fishing or stored orientation. Typically, many fishing boats 90 utilize outrigger assemblies so as to maintain a fishing line of the fishing pole 24 generally spaced apart from one another and from the boat 90 during trolling type fishing. Moreover, the preferred usage of typical outriggers calls for the fishing poles 24 to be extended at an upwardly angled elevation, which often extends well above a maximum elevation of the boat 90 itself. To this end, the outrigger lowering assembly 10 of the present invention is structured to conveniently and effectively retain the fishing pole 24, while also facilitating the lowering of the fishing pole 24 into a generally lowered orientation that enables overhead obstacles to be more readily cleared.

Looking specifically to the Figures, the outrigger lowering assembly 10 of the present invention includes an outrigger engagement hub 20 which actually receives the fishing pole 24 securely therein. To this end, the outrigger engagement hub 20 preferably includes a generally tubular retention segment 22 into which the fishing pole butt end 24' of the fishing pole 24 extends for secure retention. The retention segments 22 may be of a varied elongation and may include a variety of interior locking structures as is conventional in the art, for achieving secure interlocked engagement with the fishing pole butt end 24' of the fishing pole 24. Depending preferably downwardly from the retention segment 22 of the outrigger engagement hub 20 is a pivot segment 25. The pivot segment 25 is preferably constructed of a strong rigid and durable configuration so as to supportably hold the retention 22 and accordingly the fishing pole 24. Also, as illustrated in the Figures, the pivot segment 25 is preferably disposed at a generally perpendicular orientation relative to the retention segment 22 so as to facilitate orientation of the retention segment 22 as needed.

The outrigger lowering assembly 10 of the present invention further includes a base assembly 30. In particular, the base assembly 30 is structured to be supportably coupled to a support surface, such as to a floor or other portion of the boat 90. Moreover, the pivot segment 25 is structured to pivot relative to the base assembly 30 so as to achieve the varying elevation orientations of the outrigger engagement hub 20 between at least a first and a second elevation positions. In the preferred embodiment, when in the first elevation position the retention segment 22 is disposed so as to maintain the fishing pole 24 in a generally lowered orientation, while in the second elevation position the retention segment 22 is oriented so as to maintain the fishing pole 24 in a generally elevated orientation. Of course, it is noted that a variety of additional elevation orientations may be desired, if, for example, an adjustment of an upward angle beyond a single elevated and a single lowered orientation is required.

Figures 2, 3:
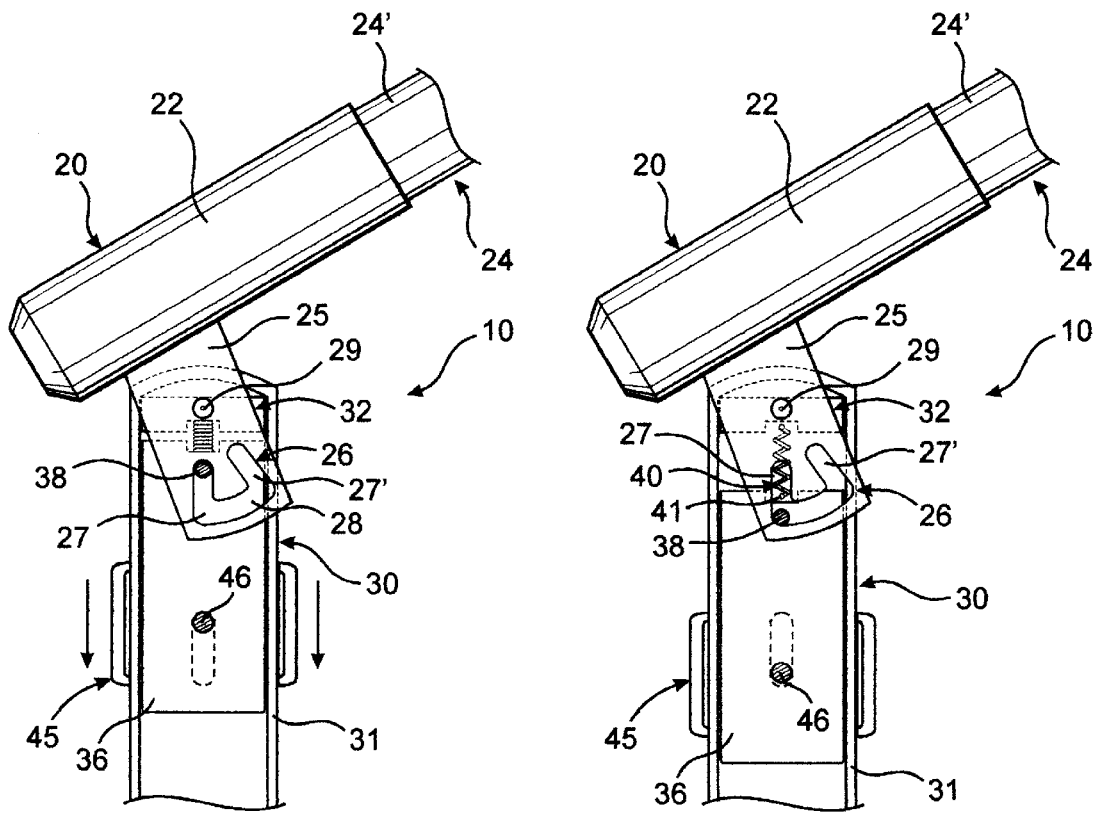
FIG. 2 is a side, partial cross-section view of the outrigger lowering assembly locked a first elevation position.
FIG. 3 is a side, partial cross-section view of the outrigger lowering assembly illustrating the disengaged orientation.
Figure 4:
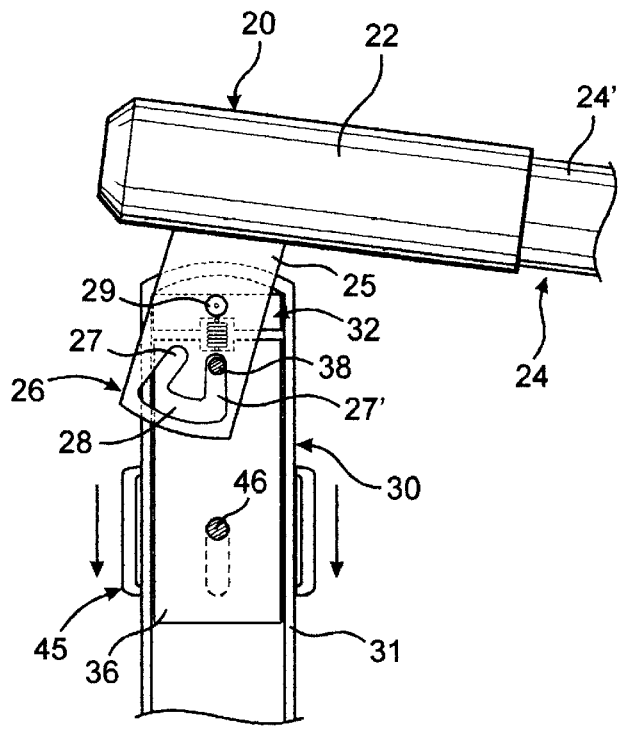
FIG. 4 is a side, partial cross-section view of the outrigger lowering assembly locked in a second elevation position.
Figure 6:
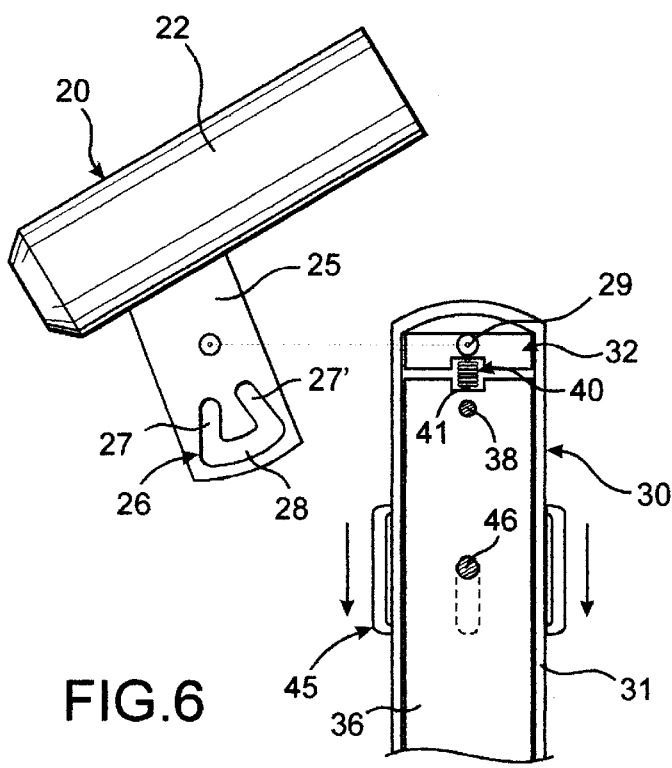
FIG. 6 is an exploded partial cross-sectional view of the outrigger lowering assembly.
Figure 5:
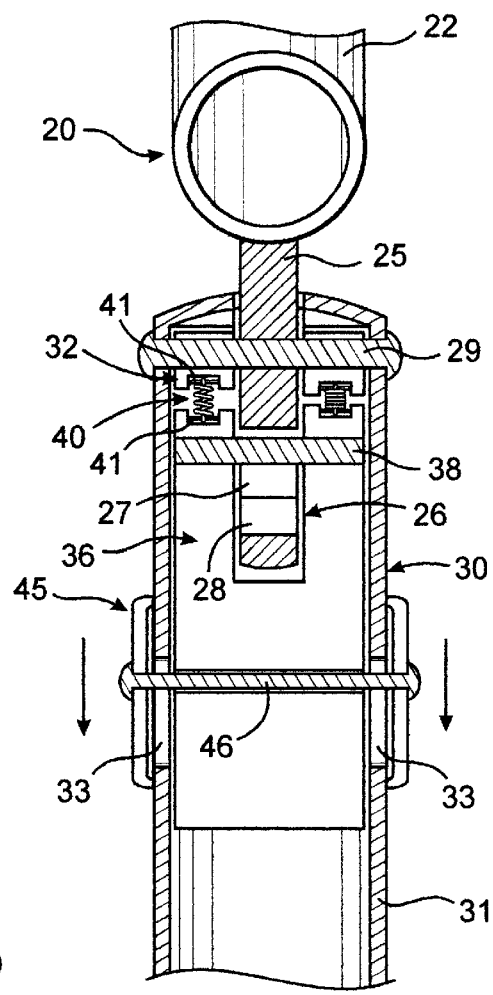
FIG. 5 is a rear cross-section view of the outrigger lowering assembly of the present invention.

The base assembly 30 of the present invention preferably includes a generally elongate support stanchion 31. Specifically, the support stanchion 31 preferably includes a generally elongate, tubular or merely partially tubular configuration and is coupled with the boat 90 in any of a number of conventional manners, such as through braces, brackets and the like. Moreover, the support stanchion 31 provides a generally uniform and aesthetic exterior appearance to the base assembly 30. Preferably concealed, at least partially, by the support stanchion 31, and also included as part of the base assembly 30, are a first housing portion 32 and a second housing portion 36. As illustrated in the Figures, the first and second housing portions 32 and 36 are structured to be movably coupled with one another so as to be orientable between a locked orientation, as in FIGS. 2, 4 and 6, and a disengaged orientation, as in FIG. 3. Preferably, however, the first and second housing portions 32 and 36 will be normally maintained in the locked orientation. Looking in further detail to the preferred first and second housing portions 32 and 36 of the present invention. The first housing portion 32 is preferably coupled, either directly or indirectly to the support surface, while the second housing portion 36 is movable relative to the first housing portion 32. As such, and as illustrated, the pivot axis 29, preferably defined by an elongate and strong pin, extends through the base assembly 30, and preferably extends through the first housing portion 32. Moreover, as best seen in FIG. 5, the first housing portion 32 is preferably split into a pair of elements which receive the pivot segment 25 in sandwiched relation therebetween, with the pivot axis 29 also extending through the pivot segment 25. Accordingly, the pivot segment 25 is retained coupled to the base assembly 30, while still being pivotable relative thereto about the pivot axis 29, while the first housing portions 32 are fixedly retained within the preferred support stanchion 31 of the base assembly 30. To this end, a separate element may be provided to prevent pivotal movement of the first housing portion 32 relative to the support stanchion 31, however, in the preferred embodiment it is the close, proximate fitted engagement between the first housing portion 32 and the support stanchion 31 which prevents any pivoted movement therebetween, while the pivot axis 29 prevents vertical movement of the first housing portion 32.

As indicated, the first and second housing portions 32 and 36 are preferably normally disposed in a locked orientation, but move relative to one another. So as to facilitate this configuration, a restraining assembly 40 is provided. In the preferred embodiment, the restraining assembly 40 includes a biasing element such as an elongate spring which is coupled at opposite ends thereof, such as through small cross pins 41 or a like structure, to the first and second housing portions 32 and 36. Moreover, while it is seen that the first and second housing portions 32 and 36, along with the restraining assembly 40 may be positioned and structured such that the preferred movement of the second housing portion 36 relative to the first housing portion 32 will include upward pushing thereof so as to compress the restraining assembly 40 upon movement into the disengaged orientation, in the preferred embodiment, the second housing portion 36 is preferably structured to be moved relative to the first housing portion 32 by being pulled downwardly and thereby expanding the restraining assembly 40 until the disengaged orientation is achieved.

So as to provide for exterior actuation, and the preferred downward pulling of the second housing portion 36, an actuation hub 45 is provided. In particular, the actuation hub 45 is a collar type element which may be comprised of one or multiple elements and extends about an exterior surface of the support stanchion 31 so as to slide vertically along that exterior surface of the support stanchion 31 upon actuation thereof. Moreover, the actuation hub 45 preferably includes at least one engagement segment 46 that extends through the support stanchion 31 and into coupled engagement with the second housing portion 36. In this regard, it is noted that the engagement segment 46 may include one or more smaller segments that do not extend completely through and across the support stanchion, but merely extend partially into the second housing portion 36 sufficient so as to provide for coupled interconnection between the actuation hub 45 and the second housing portion 36. Furthermore, in order to permit the vertical movement of the actuation hub 45 and corresponding vertical movement of the second housing portion 36, at least one elongate slot 33 is preferably defined in the support stanchion 31. The elongate slot 33 is configured to permit the limited vertical movement therethrough of the engagement segment 46 so as to provide for sufficient clearance and movability of the second housing portions 36 relative to the first housing portion 32. Moreover, the actuation hub 45 is preferably sized and configured so as to generally conceal the elongate slot 33 in the support stanchion 31 during a full range of vertical movement thereof. As such, when a user wishes to achieve the disengaged orientation, they must, in the preferred embodiment, merely pull down on the actuation hub 45 until a normal return to the locked orientation is desired.

Looking further to the preferred embodiment of the present invention as illustrated in the Figures, the base assembly 30 preferably includes a lock element 38 that is structured to move with corresponding relative movement between the first and second housing portions 32 and 36. In the preferred embodiment the lock element 38 includes a pin, the pin being structured to be cooperatively engaged with preferably the second housing portion 36, such that vertical movement of the second housing portion 36 relative to the first housing portion 32 results in corresponding vertical movement of the lock element 38. Of course, the lock element could be coupled to the first housing portion 32 or to the pivot segment 25 in alternative embodiments, with a corresponding modification of the remaining structure. In particular, the pivot segment 25 preferably includes a mating lock structure 26 which is disposed in mating interconnection with the lock element 38 of the base assembly 30. In the preferred embodiment, the mating lock structure 26 includes a channel defined in the pivot segment 25 and through which the lock element 38 moves upon pivoted movement of the pivot segment 25. As illustrated in the Figures, the channel of the mating lock structure 26 preferably includes at least two lock positions 27 and 27' defined therein, each lock position 27 and 27' corresponding one of the elevation positions of the outrigger engagement hub 20. In this regard, if more than two elevation orientations are desired, additional lock positions may be defined in the mating lock structure 26. In the preferred embodiment, the lock positions 27 and 27' preferably depend upwardly from an interconnecting channel segment 28 which permits the movement of the lock element 38 through the mating lock structure 26 from one lock position 27 to another. Of course if the restraining assembly requires compression in order to achieve the disengaged orientation, the lock positions preferably depend downwardly. Moreover, as the lock element 38 is preferably coupled with the second housing portion 36, when the second housing portion 36 is disposed in its normally locked orientation, the lock element 38 is disposed up into one of the lock positions 27 and 27' and is retained therein unless affirmatively disengaged through the movement of the second housing portion 36 relative to the first housing portion 32, such as downward movement in the preferred embodiment. Because of the general depth of the individual lock positions 27 and 27', a generally secure engagement and retention of the lock element 38 therein is achieved, and the outrigger engagement hub 20 will be maintained in its desired elevation orientation in a substantially secure manner. When, however, variation of the elevation orientation is desired, the actuation hub 45 is pulled preferably downwardly, thereby affirmatively urging the second housing portion 36 out of its locked orientation and into its disengaged orientation, as in FIG. 3, wherein the lock element 38 is lowered out of the lock position 27 or 27' in which it rested. At that point, with the second housing portion 36 being pulled downwardly and retained in its disengaged orientation, the outrigger engagement hub 20 may be pivotally moved into the new desired elevation orientation, with the lock element 38 correspondingly moving through the mating lock structure 26 and into alignment with another of the lock positions. Once in that new desired elevation orientation, the second housing portion 36 is released and the normal bias of the restraining assembly 40 functions to once again urge the second housing portion 36 back into its locked orientation, and accordingly the lock element 38 back into a corresponding lock position 27 or 27' of the mating lock structure 26.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An outrigger lowering assembly comprising:

an outrigger engagement hub structured and disposed to receive a fishing pole butt end of a fishing pole securely therein, said outrigger engagement hub including a retention segment in which said fishing pole butt end is disposed, and a pivot segment supportingly extending from said retention segment, a base assembly structured to be supportably coupled to a support surface, said pivot segment being structured to pivot relative to said base assembly so as to vary an elevation orientation of said outrigger engagement hub between at least a first elevation position, wherein said retention segment is disposed to maintain said fishing pole in a generally lowered orientation, and a second elevation position, wherein said retention segment is disposed to maintain said fishing pole in a generally elevated orientation, said base assembly including a first housing portion and a second housing portion movably coupled with one another between a locked orientation and a disengaged orientation, a restraining assembly structured to maintain said first and said second housing portions of said base assembly normally in said locked orientation, said base assembly further including a lock element, said lock element being structured to move with corresponding relative movement between said first and said second housing portions, said pivot segment including a mating lock structure disposed in mating interconnection with said lock element of said base assembly, and said lock element of said base assembly being disposed so as to restrict said pivoted movement of said pivot segment relative to said base upon said first and said second housing portions being disposed in said locked orientation, and said lock element of said base assembly being disposed so as to permit pivoted movement of said pivot segment relative to said base upon said first and said second housing portions being disposed in said disengaged orientation.

2. An outrigger lowering assembly as recited in claim 1 wherein said lock element includes a pin and said mating lock structure of said pivot segment includes a channel through which said pin moves upon pivoted movement of said pivot segment, and accordingly upon pivoted movement of said outrigger engagement hub relative to said base assembly.

3. An outrigger lowering assembly as recited in claim 2 wherein said channel includes at least two lock positions defined therein, each of said lock positions corresponding one of said elevation positions of said outrigger engagement hub and being structured and disposed to retain said pin of said lock element therein while said first and said second housing portions are disposed in said locked orientation.

4. An outrigger lowering assembly as recited in claim 3 wherein movement of said first and said second housing portions relative to one another and into said disengaged orientation urges said pin of said lock element out of said lock position such that said pin may slide through said channel upon pivoted movement of said outrigger engagement hub relative to said base assembly.

5. An outrigger lowering assembly as recited in claim 4 wherein said channel includes a generally U-shaped configuration.

6. An outrigger lowering assembly as recited in claim 1 wherein said first housing portion is coupled to said support is surface and said second housing portion is movable relative to said first housing portion so as to achieve said locked orientation and said disengaged orientation.

7. An outrigger lowering assembly as recited in claim 6 wherein said base assembly further includes a support stanchion, said support stanchion being coupled with said first housing portion and said support surface, and generally concealing said first and said second housing portions therein.

8. An outrigger lowering assembly as recited in claim 7 further comprising an actuation hub coupled with said second housing portion through said support stanchion so as to facilitate exterior actuation of said second housing portion upon movement thereof along an exterior surface of said support stanchion.

9. An outrigger lowering assembly as recited in claim 8 wherein said actuation hub includes at least one engagement segment extending therefrom and through said support stanchion into coupled engagement with said second housing portion, said support stanchion including at least one elongate slot defined therein through which said engagement segment movably extends.

10. An outrigger lowering assembly as recited in claim 3 wherein said restraining assembly includes a biasing element la coupled to said second housing portion and structured to maintain said second housing portion normally in said locked orientation.

11. An outrigger lowering assembly as recited in claim 10 wherein said lock positions defined in said channel depend upwardly such that said biasing element is structured to be expanded from said first housing portion upon said second housing portion being urged into said disengaged orientation.

12. An outrigger lowering assembly as recited in claim 1 wherein said first housing portion is structured to receive said pivot segment in sandwiched relation therein so as to facilitate pivoted movement of said pivot segment relative thereto, said first housing portion further including a pivot axis structured to extend therethrough and into coupled engagement with said pivot segment so as to retain said outrigger engagement hub movably secured to said base assembly.

13. An outrigger lowering assembly comprising:
an outrigger engagement hub structured and disposed to receive a fishing pole butt end of a fishing pole securely therein,
said outrigger engagement hub including a retention segment in which said fishing pole butt end is disposed, and a pivot segment supportingly extending from said retention segment,
a base assembly structured to be supportably coupled to a support surface,
said pivot segment being structured to pivot relative to said base assembly so as to vary an elevation orientation of said outrigger engagement hub between at least a first elevation position, wherein said retention segment is disposed to maintain said fishing pole in a generally lowered orientation, and a second elevation position, wherein said retention segment is disposed to maintain said fishing pole in a generally elevated orientation, said base assembly including a first housing portion and a second housing portion movably coupled with one another between a locked orientation and a disengaged orientation,
a restraining assembly structured to maintain said first and said second housing portions of said base assembly normally in said locked orientation,
said base assembly further including a lock element, said lock element including a pin structured and disposed to move with corresponding relative movement between said first and said second housing portions,
said pivot segment including a mating lock structure, said mating lock structure including a channel disposed in mating interconnection with said pin of said lock element of said base assembly such that pin is able to selectively move therethrough upon pivoted movement of said pivot segment,
said channel including at least two lock positions defined therein, each of said lock positions corresponding one of said elevation positions of said outrigger engagement hub and being structured and disposed to retain said pin of said lock element therein while said first and said second housing portions are disposed in said locked orientation, thereby restricting pivoted movement of said pivot segment relative to said base and out of a select one of said first and second elevation positions, and
said pin of said base assembly being further structured to move out of said lock positions and through said channel upon said relative movement between said first and said second housing portions into said disengaged orientation so as to permit pivoted movement of said pivot segment relative to said base and between said first and said second elevation positions.

* * * * *